United States Patent
Schreiber

(10) Patent No.: US 7,251,888 B2
(45) Date of Patent: Aug. 7, 2007

(54) HOLLOW FAN BLADE FOR AIRCRAFT ENGINES AND METHOD FOR ITS MANUFACTURE

(75) Inventor: Karl Schreiber, Am Mellensee (DE)

(73) Assignee: Rolls-Royce Deutschland Ltd & Co KG, Blankenfelde-Mahlow (DE)

(*) Notice: Subject to any disclaimer, the term of this patent is extended or adjusted under 35 U.S.C. 154(b) by 179 days.

(21) Appl. No.: 10/962,539

(22) Filed: Oct. 13, 2004

(65) Prior Publication Data
US 2005/0079059 A1 Apr. 14, 2005

(30) Foreign Application Priority Data
Oct. 14, 2003 (DE) ............................. 103 49 073

(51) Int. Cl.
B21D 53/78 (2006.01)
F01D 5/18 (2006.01)

(52) U.S. Cl. .................................. 29/889.72; 416/232

(58) Field of Classification Search ............... 416/232, 416/233, 234, 235; 29/889.72
See application file for complete search history.

(56) References Cited

U.S. PATENT DOCUMENTS

| | | | |
|---|---|---|---|
| 1,998,393 A | | 4/1935 | Junggren |
| 2,463,340 A | * | 3/1949 | Wiberg ........................ 416/92 |
| 2,657,902 A | * | 11/1953 | Williams ................. 416/213 R |
| 2,848,193 A | | 8/1958 | Sells |
| 4,214,355 A | * | 7/1980 | Zelahy ....................... 29/889.1 |
| 5,429,877 A | * | 7/1995 | Eylon ........................... 428/586 |
| 5,692,881 A | | 12/1997 | Leibfried |
| 5,711,068 A | | 1/1998 | Salt |
| 5,797,182 A | | 8/1998 | Furlan et al. |
| 5,876,183 A | | 3/1999 | Furlan et al. |
| 6,033,186 A | | 3/2000 | Schilling et al. |
| 6,565,680 B1 | * | 5/2003 | Jackson et al. ............. 148/428 |
| 6,644,921 B2 | * | 11/2003 | Bunker et al. ............ 416/97 R |
| 7,033,131 B2 | * | 4/2006 | Schreiber ..................... 415/12 |

FOREIGN PATENT DOCUMENTS

| | | |
|---|---|---|
| DE | 1627779 | 7/1971 |
| DE | 19542080 | 1/1997 |
| FR | 970578 | 1/1951 |
| GB | 702740 | 1/1954 |
| GB | 1089247 | 11/1967 |

OTHER PUBLICATIONS

German Search Report dated Jul. 20, 2004.

* cited by examiner

Primary Examiner—Edward K. Look
Assistant Examiner—Devin Hanan
(74) Attorney, Agent, or Firm—Timothy J. Klima

(57) ABSTRACT

A hollow fan blade for the fan of an aircraft engine includes a blade base section (2) and a blade tip section (5) which are assembled at opposing faying surfaces (6, 6') by a joining process. Starting from the respective faying surface, cavities (7, 9) are produced in the two blade portions (2, 5) which are dimensioned in accordance with the loads occurring in the respective blade areas. The joining weld (4) is in a low-loaded area. The blade base section and the blade tip section can be constructed of solid material with formed-in cavities. The blade tip section can also be a sheet-metal structure.

22 Claims, 2 Drawing Sheets

HOLLOW FAN BLADE FOR AIRCRAFT ENGINES AND METHOD FOR ITS MANUFACTURE

This application claims priority to German Patent Application DE10349073.6 filed Oct. 14, 2003, the entirety of which is incorporated by reference herein.

BACKGROUND OF THE INVENTION

This invention relates to a hollow fan blade for the fan of an aircraft engine with cavities provided in the blade for weight reduction and, further, to a method for the manufacture of such a blade.

The fan blades are the foremost rotating components of an aircraft engine and are, therefore, subject to considerable loads by ingested foreign bodies, such as birds, primarily in the take-off phase. In order to withstand the extremely high loads, the fan blades are made of a high-strength metal, metal alloy or fiber-reinforced polymer with metallic leading edge protection and dimensioned adequately. Such solid blades are, on the one hand, very costly due to the high amount of expensive material invested and, on the other hand, the mechanical loads arising from natural vibrations, vibration amplitude and centrifugal forces are high. Furthermore, the fan containments must be dimensioned commensurate with the high weight of solid blades, this entailing a further increase in weight of the aircraft engine and additional costs.

For high-power aircraft engines, hollow fan blades, i.e. fan blades with inner cavities, have already been developed to save weight and to avoid the disadvantages resulting from a high weight. The known hollow blades according to Patents U.S. Pat. No. 5,692,881 and U.S. Pat. No. 6,033,186, for example, which are known as fabricated structures, require, however, complicated and accordingly costly forming and joining techniques for their production.

It has also been proposed to provide the blade with long cavities originating at the blade tip and extending towards the blade root and to produce these cavities by means of known material removal processes, such as ECM (electrochemical machining) or EDM (electro-discharge machining). This method, or the blades produced by this method, is/are, however, disadvantageous in that the cavities, due to the curvature of the blades, can only be produced in a limited tip area, as a result of which the weight saving and cost reduction effect is minimal.

BRIEF SUMMARY OF THE INVENTION

The present invention, in a broad aspect, provides a method for the production of hollow fan blades with low weight, high mechanical strength and low manufacturing and cost investment, as well as a hollow fan blade produced by this method.

It is a particular object of the present invention to provide a solution to the above problems by a hollow fan blade and a method for its manufacture designed in accordance with the features described herein. Advantageous and suitable embodiments of the present invention will be apparent from the description below.

According to the present invention, the hollow fan blade is made of two blade portions, namely a blade base section and a blade tip section, assembled by a joining process, with the blade tip section being limited to the upper, low-stressed area of the hollow fan blade. The split design enables cavities to be produced over a large area of a fan blade made of solid material which, starting from the adjacent, free faying surfaces of the individual blade portions, are produced by known methods, for example electrochemical machining. The blade is split in an area in which the joint will withstand the forces acting in this area without any problems, so that the production of such a joint is possible and permissible as neither reliability nor life are affected. The added blade tip section may, however, also be made of a sheet-metal structure, which has larger cavities and, therefore, less weight than a blade tip section made of solid material, and which also can be assembled to the solid, cavitary blade base section by known joining processes, for example laser welding. The portion connected in the tip area by a joining process can be of filigree design since the operating loads are relatively low (e.g. stresses of max. 150 MPa). In the case of foreign object damage (FOD), the potential mass loss at the fan blade tip is so small that the resultant imbalance will not lead to an automatic shutdown of the engine.

BRIEF DESCRIPTION OF THE DRAWINGS

The present invention is more fully described in the light of the accompanying drawings, showing preferred embodiments. In the drawings.

DETAILED DESCRIPTION OF THE INVENTION

Figure 1:
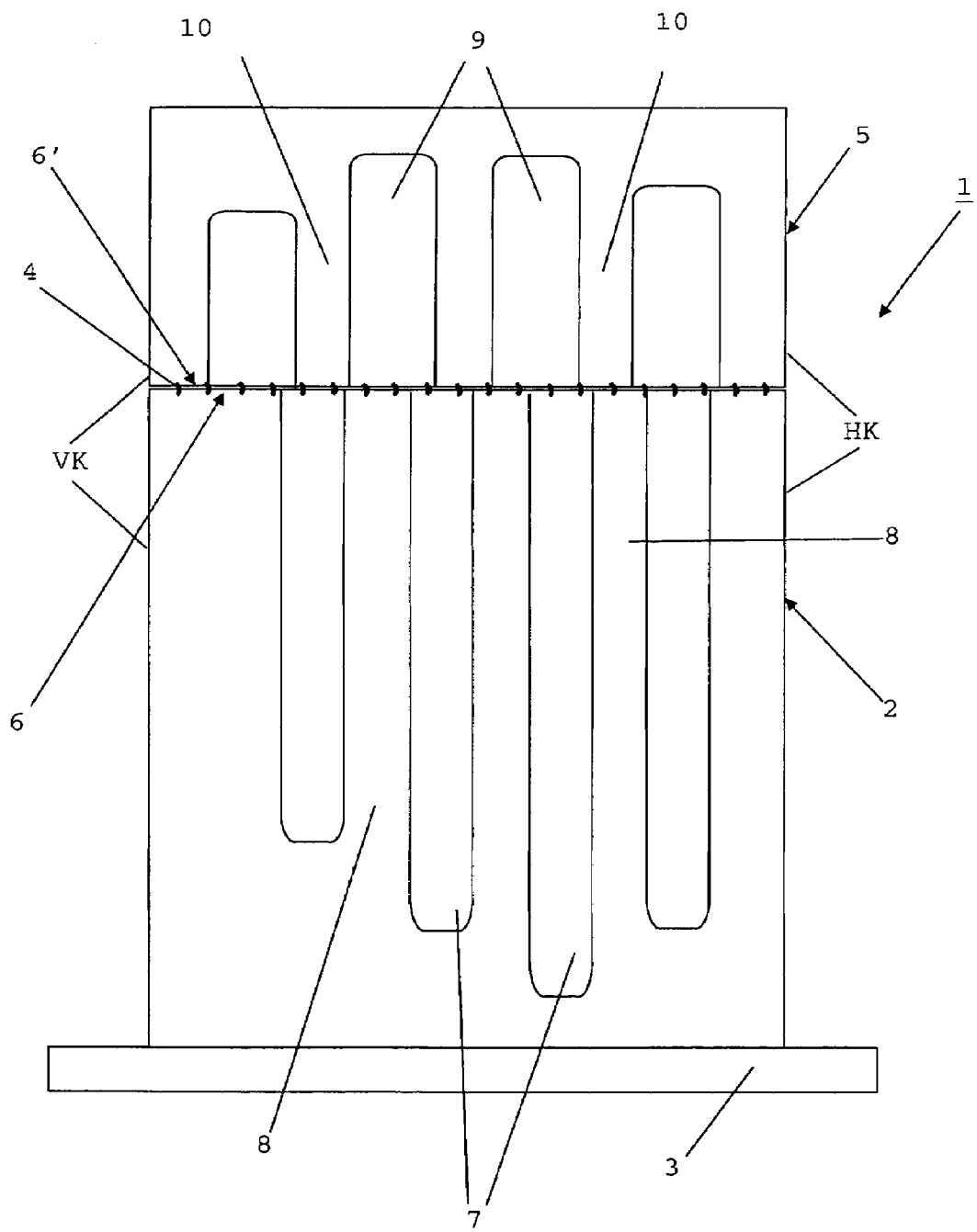
FIG. 1 is a schematic sectional side view of a hollow fan blade produced, in accordance with the inventive method, from a blade base section and a blade tip section, each made of solid material.
Figure 2:
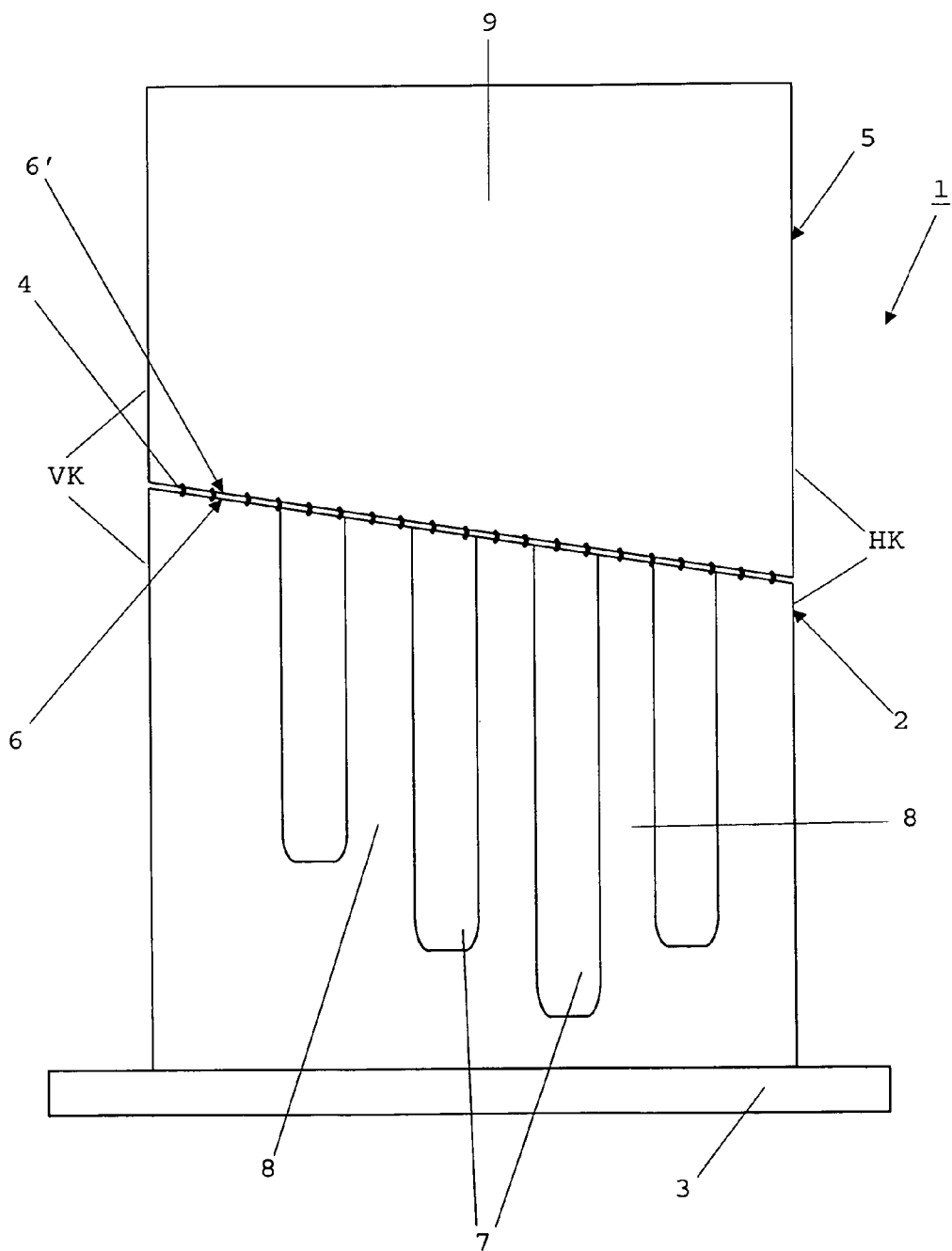
FIG. 2 is a schematic sectional side view of the hollow fan blade according to FIG. 1, but with the blade tip section being fabricated of a sheet-metal structure.

According to FIGS. 1 and 2, the fan blade 1 is of a two-part design and consists of a blade base section 2 (blade bottom portion 2) with blade root 3 and a blade tip section 5 (blade top portion 5) assembled to the blade base section 2 by means of a joining weld 4. The blade base section 2 according to FIGS. 1 and 2 is made of metal, for example titanium, or a metal alloy, and contains, in its interior, several, long cavities 7 with essentially rectangular to oval or round cross-section which originate at the upper abutting edge 6 of the blade base section 2. The cavities 7 are dimensioned such that the remaining wall thickness and the thickness of the reinforcements 8 formed between the cavities 7 provide a fan blade 1 which satisfies the high load and strength requirements in this area. This applies similarly to the depth of the cavities 7, which can be larger in a mid-section than in the higher loaded outer sections near the leading edge VK or the trailing edge HK, respectively, of the fan blade 1.

The blade tip section 5 comprises the upper area of the fan blade 1 which, since it is loaded to a lesser extent, can be made of a solid material, or an assembled structure such as a sheet-metal structure comprising sheet-metal parts produced by a forming process and joined by welding, as shown in FIG. 2.

As becomes apparent from the illustration in FIG. 2, the sheet-metal structure can be open at the tip, with an outer wall comprising a single cavity only. Alternatively, additional structural walls can be added for additional strength, which may divide the single cavity into multiple cavities.

As shown in FIG. 1, a blade tip section 5 made of solid material comprises—similarly to the blade base section 2—cavities 9 originating at its bottom abutting edge or faying surface 6'. Basically, the thickness of the opposite outer walls and of the reinforcements 10 between the cavities 9 can be smaller on the blade tip section 5 than on the blade base section 2 since the blade tip section 5 is loaded to a lesser extent, irrespective of whether the latter is made of solid material or fabricated of a welded sheet-metal structure. The statements made above for the blade base section 2 apply similarly to the dimensioning and the arrangement or distribution of the cavities 9 in the blade tip section 5.

The method for the manufacture of the above-described fan blade 1 comprises, in accordance with a first and a second variant, the separation of a solid fan blade into a blade base section 2 and a blade tip section 5 by means of a parting process, or, the separate production of a solid blade base section 2 and a solid blade tip section 5, respectively.

Starting from the free faying surface existing at the respective abutting edges 6, 6', the cavities 7 or 9, respectively, are produced, in the form described in the above, in the respective solid blade body by means of known material removal processes, such as electrochemical machining (ECM). Then, the two solid blade portions 2 and 5 are assembled at the abutting edges 6, 6' via a joining weld 4 produced by way of a known joining process, such as laser welding. With the loads in this upper area of the fan blade 1 being low, joining the two blade portions 2 and 5 by a suitable welding process does not constitute a hazard in terms of blade failure.

In one embodiment, each blade portion made of a solid material comprises multiple cavities having a constant cross-section in the longitudinal axis and their forging geometry is optimized with regard to aerodynamics and strength in accordance with the cavity structure.

In accordance with a third process variant (FIG. 2), the blade base section 2 is made separately of solid material, while the blade tip section 5 is also made separately, but fabricated as a multi-part sheet-metal weldment of the type described in the above. The blade portions 2 and 5 so produced are also assembled at the abutting edges by means of a suitable joining process, such as laser welding. Other suitable processes are tungsten inert gas (TIG) or electron beam (EB) welding.

Hollow fan blades of the designs described above can be produced cost-effectively and with significantly lower mass than the known hollow fan blades. This entails a substantial reduction in disk load and g forces, which enables the weight of the disk and the fan containment to be reduced accordingly. A particularly cost-effective and weight-saving production of hollow fan blades is achievable if the low-loaded blade tip section is a sheet-metal fabrication with filigree and ductile sheet-metal structure. In an alternative embodiment, the fan blade can be constructed o three or more sections produced as described above and joined together.

LIST OF REFERENCE NUMERALS 1 fan blade
2 blade base section (blade bottom portion)
3 blade root
4 joining weld
5 blade tip section (blade top portion)
6 upper abutting edge/faying surface
6' lower abutting edge/faying surface
7 first cavity
8 first reinforcement
9 second cavity
10 second reinforcement
VK Leading edge
HK trailing edge

What is claimed is:

1. A method for the manufacture of a hollow fan blade for the fan of an aircraft engine, comprising:
    forming at least two fan blade sections, including a blade base section having an upper faying surface and a blade tip section having a lower faying surface, the blade base section being formed of a solid material;
    forming at least one internal cavity in each blade section originating from the respective faying surface, the number and dimensioning of each cavity depending on an expected load on the blade in the respective area;
    joining the blade sections together at their respective faying surfaces by a welding process,
    wherein the two fan blade sections are formed by cutting a single fan blade transversely to a longitudinal axis of the fan blade.

2. A method in accordance with claim 1, wherein the blade portions are joined by one of the group of TIG, EB and laser welding.

3. A method in accordance with claim 2, wherein the respective cavities are formed by a metal removal process.

4. A method in accordance with claim 3, wherein the material removal process is at least one from the group of electro-chemical machining and electro-discharge machining.

5. A method in accordance with claim 1, wherein the respective cavities are formed by a metal removal process.

6. A method in accordance with claim 5, wherein the material removal process is at least one from the group of electro-chemical machining and electro-discharge machining.

7. A method in accordance with claim 1, wherein the blade tip section and blade base section are formed separately from one another.

8. A method in accordance with claim 7, wherein the blade tip section is formed of a solid material.

9. A method in accordance with claim 8, wherein the respective cavities are formed by a metal removal process.

10. A method in accordance with claim 9, wherein the material removal process is at least one from the group of electro-chemical machining and electro-discharge machining.

11. A method in accordance with claim 10, wherein the blade portions are joined by one of the group of TIG, EB and laser welding.

12. A method in accordance with claim 7, wherein the blade portions are joined by one of the group of TIG, EB and laser welding.

13. A method in accordance with claim 1, wherein the blade tip section is fabricated with formed and welded sheet metal components.

14. A method in accordance with claim 13, wherein the blade tip section is formed as a sheet metal outer wall encompassing one single cavity.

15. A method in accordance with claim 14, wherein the blade tip section is formed with an opening at its tip.

16. A method in accordance with claim 15, wherein the blade portions are joined by one of the group of TIG, EB and laser welding.

17. A method in accordance with claim 13, wherein the blade tip section is formed with an opening at its tip.

18. A method in accordance with claim 13, wherein the blade portions are joined by one of the group of TIG, EB and laser welding.

19. A method for the manufacture of a hollow fan blade for the fan of an aircraft engine, comprising;

forming at least two fan blade sections, including a blade base section having an upper faying surface and a blade tip section having a lower faying surface, the blade base section being formed of a solid material;

forming at least one internal cavity in each blade section originating from the respective faying surface, the number and dimensioning of each cavity depending on an expected load on the blade in the respective area;

joining the blade sections together at their respective faying surfaces by a welding process, wherein the respective cavities are formed by a metal removal process.

20. A method in accordance with claim 19, wherein the material removal process is at least one from the group of electro-chemical machining and electro-discharge machining.

21. A method in accordance with claim 20, wherein the blade portions are joined by one of the group of TIG, EB and laser welding.

22. A method in accordance with claim 19, wherein the blade tip section is formed of a solid material.

\* \* \* \* \*